United States Patent
Heitz, III et al.

(10) Patent No.: US 10,055,493 B2
(45) Date of Patent: Aug. 21, 2018

(54) GENERATING A PLAYLIST

(75) Inventors: Geremy A. Heitz, III, Mountain View, CA (US); Adam Berenzweig, Brooklyn, NY (US); Jason E. Weston, New York, NY (US); Ron J. Weiss, New York, NY (US); Sally A. Goldman, Palo Alto, CA (US); Thomas Walters, San Francisco, CA (US); Samy Bengio, Mountain View, CA (US); Douglas Eck, Palo Alto, CA (US); Jay M. Ponte, Mountain View, CA (US); Ryan M. Rifkin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 574 days.

(21) Appl. No.: 13/103,445

(22) Filed: May 9, 2011

(65) Prior Publication Data

US 2012/0290621 A1 Nov. 15, 2012

(51) Int. Cl.
*G06F 17/30* (2006.01)

(52) U.S. Cl.
CPC .. *G06F 17/30772* (2013.01); *G06F 17/30743* (2013.01)

(58) Field of Classification Search
CPC ......... G06F 17/30053; G06F 17/30743; G06F 17/30749; G06F 17/30758; G06F 17/30772; G06F 17/30755; G06F 17/30787; G06F 17/3074; G06F 17/30017; G06F 17/30752; G06F 17/30784
USPC ........ 707/706, 759, 780, 737, 749, 758, 916
See application file for complete search history.

(56) References Cited

U.S. PATENT DOCUMENTS

| | | | | |
|---|---|---|---|---|
| 4,633,200 A | * | 12/1986 | Adler | H04B 3/142 330/295 |
| 6,675,140 B1 | * | 1/2004 | Irino | G06F 17/14 382/100 |
| 8,126,833 B2 | * | 2/2012 | Cobb | G06K 9/6215 382/155 |
| 8,175,989 B1 | * | 5/2012 | Gopinath | G06N 7/005 706/45 |

(Continued)

FOREIGN PATENT DOCUMENTS

| | | |
|---|---|---|
| EP | 2068255 A2 | 6/2009 |
| EP | 2068255 A3 | 3/2010 |

OTHER PUBLICATIONS

International Search Report and Written Opinion, received in corresponding International Patent Application No. PCT/US2012/036140, dated Jul. 17, 2012, (11 pages).

(Continued)

*Primary Examiner* — Ashish K Thomas
*Assistant Examiner* — Rezwanul Mahmood
(74) *Attorney, Agent, or Firm* — Byrne Poh LLP

(57) ABSTRACT

Generating a playlist may include designating a seed track in an audio library; identifying audio tracks in the audio library having constructs that are within a range of a corresponding construct of the seed track, where the constructs for the audio tracks are derived from frequency representations of the audio tracks, and the corresponding construct for the seed track is derived from a frequency representation of the seed track; and generating the playlist using at least some of the audio tracks that were identified.

19 Claims, 8 Drawing Sheets

(56) References Cited

U.S. PATENT DOCUMENTS

| | | | | |
|---|---|---|---|---|
| 8,326,584 | B1* | 12/2012 | Wells | G06F 17/30017 703/2 |
| 9,576,050 | B1* | 2/2017 | Walters | G06F 17/30755 |
| 2002/0082901 | A1* | 6/2002 | Dunning | G06F 17/30017 707/E17.059 |
| 2002/0165875 | A1* | 11/2002 | Verta | G16H 40/20 715/213 |
| 2003/0101164 | A1* | 5/2003 | Pic | G06F 17/30017 707/999.001 |
| 2003/0205124 | A1* | 11/2003 | Foote | G10G 1/00 84/608 |
| 2004/0143349 | A1* | 7/2004 | Roberts | G06F 17/30017 700/94 |
| 2006/0020662 | A1* | 1/2006 | Robinson | G06F 15/16 709/203 |
| 2006/0107823 | A1* | 5/2006 | Platt | G06F 17/30749 707/E17.102 |
| 2007/0094275 | A1* | 4/2007 | Fanning | G06F 17/30722 707/999.01 |
| 2007/0174147 | A1* | 7/2007 | Klein, Jr. | G06Q 10/087 705/28 |
| 2007/0234056 | A1* | 10/2007 | Mani | G06F 21/32 713/172 |
| 2007/0271224 | A1* | 11/2007 | Essafi | G06F 17/3002 707/999.003 |
| 2008/0021851 | A1* | 1/2008 | Alcalde | G06F 17/30743 706/21 |
| 2008/0022846 | A1* | 1/2008 | Samadani | G06F 17/30743 707/E17.101 |
| 2008/0040110 | A1* | 2/2008 | Pereg | G10L 17/26 704/236 |
| 2008/0104111 | A1* | 5/2008 | Slaney | G06F 17/30017 707/999.107 |
| 2008/0163299 | A1 | 7/2008 | Yamamoto | |
| 2008/0168390 | A1* | 7/2008 | Benyamin | G06F 17/30743 707/999.103 |
| 2008/0181508 | A1* | 7/2008 | Kaneda | G06K 9/00248 382/190 |
| 2008/0228576 | A1* | 9/2008 | Yonezaki | G06Q 30/02 705/14.43 |
| 2008/0263099 | A1* | 10/2008 | Brady-Kalnay | G06F 17/30038 707/999.107 |
| 2008/0263476 | A1* | 10/2008 | Vignoli | G06F 17/30026 707/E17.009 |
| 2009/0019996 | A1* | 1/2009 | Fujishima | G10H 1/0025 84/625 |
| 2009/0049091 | A1* | 2/2009 | Slaney | G06F 17/30026 707/999.107 |
| 2009/0055376 | A1* | 2/2009 | Slaney | G06F 17/30026 707/999.005 |
| 2009/0063971 | A1* | 3/2009 | White | G06F 3/04817 715/716 |
| 2009/0198602 | A1* | 8/2009 | Wang | G06Q 30/02 705/35 |
| 2010/0031366 | A1* | 2/2010 | Knight | G06Q 10/10 726/26 |
| 2010/0061624 | A1* | 3/2010 | Cobb | G06K 9/00771 382/157 |
| 2010/0088585 | A1* | 4/2010 | Piersol | G06F 17/243 715/222 |
| 2010/0138427 | A1* | 6/2010 | Van De Par | G06F 17/30743 707/748 |
| 2010/0217755 | A1* | 8/2010 | Vignoli | G06F 17/30743 707/706 |
| 2010/0257234 | A1* | 10/2010 | Caughey | H04L 67/306 709/203 |
| 2010/0325135 | A1* | 12/2010 | Chen | G06F 17/30053 707/759 |
| 2011/0004472 | A1* | 1/2011 | Zlokarnik | G10L 15/065 704/233 |
| 2011/0087665 | A1* | 4/2011 | Weare | G06F 17/30038 707/737 |
| 2011/0118859 | A1* | 5/2011 | Theimer | H04S 7/30 700/94 |
| 2011/0144988 | A1* | 6/2011 | Choi | G10L 21/0208 704/233 |
| 2011/0208521 | A1* | 8/2011 | McClain | G10L 15/142 704/233 |
| 2011/0238698 | A1* | 9/2011 | Asikainen | G06F 17/3069 707/780 |
| 2011/0245941 | A1* | 10/2011 | De Waele | A63J 17/00 700/90 |
| 2011/0273455 | A1* | 11/2011 | Powar | G06F 17/30769 345/473 |
| 2011/0276155 | A1* | 11/2011 | Lindahl | G11B 27/038 700/94 |
| 2012/0011112 | A1* | 1/2012 | Bian | G06F 17/30864 707/723 |
| 2012/0022863 | A1* | 1/2012 | Cho | G10L 15/14 704/233 |
| 2012/0041955 | A1* | 2/2012 | Regev | G06F 17/3071 707/740 |
| 2012/0143599 | A1* | 6/2012 | Seltzer | G10L 15/02 704/205 |
| 2012/0284302 | A1* | 11/2012 | Takagi | G06F 17/30017 707/769 |
| 2012/0290621 | A1* | 11/2012 | Heitz, III | G06F 17/30743 707/780 |
| 2013/0040556 | A1* | 2/2013 | Robinson | G06F 15/16 455/3.02 |
| 2013/0170670 | A1* | 7/2013 | Casey | G11B 27/034 381/119 |
| 2013/0191088 | A1* | 7/2013 | Wells | G06F 17/30017 703/2 |

OTHER PUBLICATIONS

Gartner, et al., "An Adaptive Distance Measure for Similarity Based Playlist Generation", 2007 IEE International Conference on Acoustics, Speech, and Signal Processing, Apr. 2007, pp. 229-231, Honolulu. HI.

Logan, et. al., "A Music Similarity Function Based on Signal Analysis", IEEE International Conference on, Advanced Distributed Learning, Aug. 2001, pp. 952-955.

Pohle, et al., "Reinventing the Wheel": A Novel Approach to Music Player Interfaces, IEEE Transactions on Multimedia, Apr. 2007, pp. 567-575, vol. 9(3), Piscataway, NJ.

International Preliminary Report on Patentability for International Application No. PCT/US2012/036140 dated Nov. 21, 2013. 8 pages.

Weston et al., Web Scale Image Annotation: Learning to Rank with Joint Word-Image Embeddings. European Conference on Machine Learning. 2010. 8 pages.

* cited by examiner

GENERATING A PLAYLIST

TECHNICAL FIELD

This patent application relates generally to determining similarities between audio tracks, and to generating playlists from audio tracks.

BACKGROUND

Online music services provide users with access to audio tracks from various artists. Such services allow users to build libraries, and to organize those libraries according to input, or predefined, preferences. For example, audio tracks in a library may be grouped into playlists. A playlist can include a set of tracks that are grouped together, either randomly or based on some commonality. A music player for use with the music service typically reads the playlist and plays the audio tracks on the playlist randomly or in some order.

SUMMARY

This patent application describes systems and techniques for generating a playlist from a library of audio tracks.

For example, generating a playlist includes designating a seed track in an audio library. The audio library includes audio tracks, each of which, including the seed track, is represented by a construct. Each construct is derived from a frequency representation of a corresponding audio track. Playlist generation also includes identifying audio tracks in the audio library having corresponding constructs that are within a range of a corresponding construct of the seed track, and generating the playlist using at least some of the identified audio tracks. Playlist generation may include any appropriate features described herein, examples of which are the following.

Playlist generation may include determining distances between the construct for the seed track and the constructs for the audio tracks. Identifying audio tracks in the audio library having corresponding constructs that are within a range of a corresponding construct of the seed track may include comparing the distances to a designated distance corresponding to the range. The distances may be determined using cosine similarity measurements. Weights may be applied to the distances. The weights may be indicative of relative importance of frequency representations of audio tracks in generating the playlist.

Each audio track, including the seed track, may be represented by a second construct derived from attributes of the corresponding audio track. Playlist generation may also include determining distances between the second constructs for the audio tracks and the corresponding second construct for the seed track. Identifying audio tracks having one or more features that are within the range may include comparing the distances to a designated distance.

Playlist generation may include determining the constructs by obtaining metadata tags for the audio track, where the metadata tags relate to one or more attributes of the audio track, generating the frequency representation for the audio track, and generating the construct using at least one of the metadata tags and the frequency representation. The metadata tags may be obtained by retrieving information about the audio track from one or more sources. The construct may be generated using a machine-learning technique configured to move, towards each other, audio tracks in a same or related genre in an N-dimensional space (N≥2).

Playlist generation may also include using one or more heuristics to select audio tracks within the range. The playlist may be generated using the audio tracks that were selected using the one or more heuristics. The heuristics may include limitations on numbers of audio tracks having a specific attribute.

Each of the audio tracks, including the seed track, may be represented by a second construct derived from a corresponding artist associated with the audio track. Playlist generation may include determining distances between the second constructs for the audio tracks and the corresponding second construct for the seed track. Identifying audio tracks having one or more features that are within the range may include comparing the distances to a designated distance.

Playlist generation may include designating a second audio track in an audio library, and identifying additional audio tracks in the audio library having second constructs that are within a range of a corresponding second construct of the second audio track. The second constructs for the additional audio tracks may be derived from second frequency representations of the additional audio tracks, and the corresponding second construct for the second audio track may be derived from a second frequency representation of the seed track. The playlist may be generated using at least some of the additional audio tracks that were identified. The process may be extended beyond the second audio track to any number of additional audio tracks, e.g., third, fourth, fifth, etc.

Tracks in the playlist may be ordered in accordance with a decreasing-similarity preference function.

This patent application also describes a method of identifying similar audio tracks, which includes designating a first track (e.g., a seed track) among multiple audio tracks. Each of the audio tracks, including the first track, is represented by a construct. Each construct is derived from a frequency representation of a corresponding audio track. The method also includes identifying audio tracks among the multiple audio tracks having corresponding constructs that are within a range of a corresponding construct of the first track, and outputting an indication that the first track and the audio tracks are similar.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, and the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Described herein is a system for generating a playlist from a library of audio tracks (or simply "tracks"). In an example, the system designates a seed track in an audio library, and identifies audio tracks in the audio library having constructs that are within a range of a corresponding construct of the seed track. The constructs (e.g., vectors) for the audio tracks may be derived from frequency representations of the audio tracks, and the construct (e.g., a vector) for the seed track may be derived from a frequency representation of the seed track. The system further includes generating the playlist using at least some of the audio tracks that were identified as being within the range.

Figure 1:
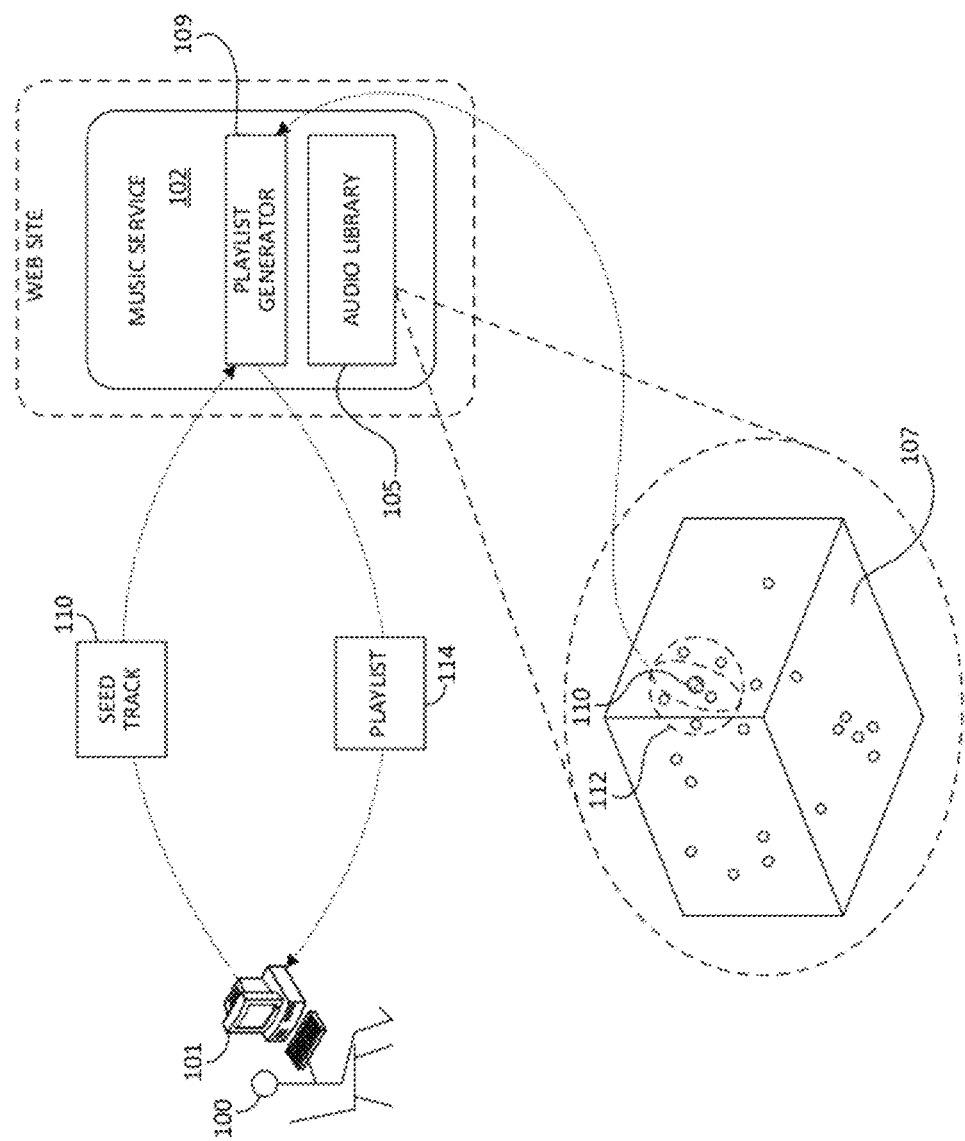
FIG. 1 shows a conceptualized version of an example of a process for generating a playlist.

FIG. 1 shows a conceptual example of the foregoing system. More detailed examples are provided in the subsequent figures and corresponding description. In the example of FIG. 1, a user 100 at a computing device 101 accesses a music service 102. Music service 102 may be hosted by a server that is remote from computing device 101. For example, music service 102 may be accessible via one or more Web sites. In this example, user 100 creates an account with music service 102. After the account is created, the user loads audio tracks into an audio library 105. For example, the audio tracks may be uploaded from computing device 101 or transferred to music service 102 from a remote location(s), such as an online music store.

The audio tracks undergo pre-processing by music service 102 to identify which of the audio tracks have features in common. Generally speaking, the pre-processing includes determination of auditory features and training that learns weights to embed artists, genres and tracks in an embedding space. This pre-processing may include identifying which tracks have similar auditory features, e.g., acoustic structures, such as frequency patterns. The pre-processing may also include obtaining metadata that identifies features of audio tracks, such as the genre of the track or the artist who performed the track, and using that metadata to identify features that tracks have in common. In an example, the audio tracks and metadata may be processed to identify which audio tracks are performed by similar artists and/or are in similar genres. Other common features may also be identified among audio tracks in the library.

In this example, constructs (e.g., vectors) that represent features of the audio tracks are mapped to an N-dimensional (N≥2) space called an embedding space. A simplified version of such an N-dimensional space 107 is shown in FIG. 1. In this example, the space is three-dimensional. The dimensions in the embedding space are latent features that ideally capture ways in which the tracks are similar.

In the example of FIG. 1, the constructs for the audio tracks are represented as an N-dimensional vector that directly corresponds to a point in the N-dimensional space. As shown in FIG. 1, some of the points move nearer (e.g., closer to or towards) each other. The relative nearness of audio tracks may be indicative of, e.g., audio tracks that are in a particular genre, audio tracks that have similar frequency patterns, and/or audio tracks by the same or similar types of artists. Locations of points for each entity in the embedding space may be stored in a repository, and may be used in generating playlists, as described herein.

User 100 may ask music service 102 to generate a playlist using a designated audio track, referred to here as a seed track. For example, user 100 may identify the seed track by selecting the seed track from among audio tracks in library 105. This may be done using a graphical user interface (GUI) for the music service, which may be accessible via a Web browser or an application running on computing device 101. A playlist generator 109, which may be part of, or associated with, music service 102 receives the identity of seed track 110, and uses the seed track to generate a playlist. In this example, playlist generator 109 retrieves the identities of audio tracks that, in the embedding space, are within a specified range of the seed track. The range may be user-specified or predefined. For example, audio tracks within the range defined by sphere 112 may be selected as playlist candidates. The range may be representative of tracks having auditory features, artists, or combinations of auditory feature and artist that are similar to (e.g., within a range of) corresponding feature(s) of seed track 110.

As described below, one or more of the selected audio tracks may be rejected as a candidate for the playlist based on heuristics applied post-selection. For example, a heuristic may require that there be no more than five tracks in a playlist by the same artist. In this example, the five tracks by the same artist that are closest in distance in the embedding space to the seed track may be used for the playlist, and other tracks by that artist, which are farther away, are rejected. In general, it is noted that it need not be the five closest tracks that are picked. Some randomization may be added so that the same seed track will result in different playlists each time. This falls under the various heuristics described herein.

Other limitations may also be applied to the playlist. For example, the number of tracks may be limited or certain genres or artists may be excluded, to name a few. These limitations may be predefined or specified by a user on a per-playlist basis. In any event, after the audio tracks for a playlist are identified, those audio tracks are accessed, and playlist 114 is generated and is provided to computing device 101. User 100 may then play the tracks in order or randomized.

Figure 2:
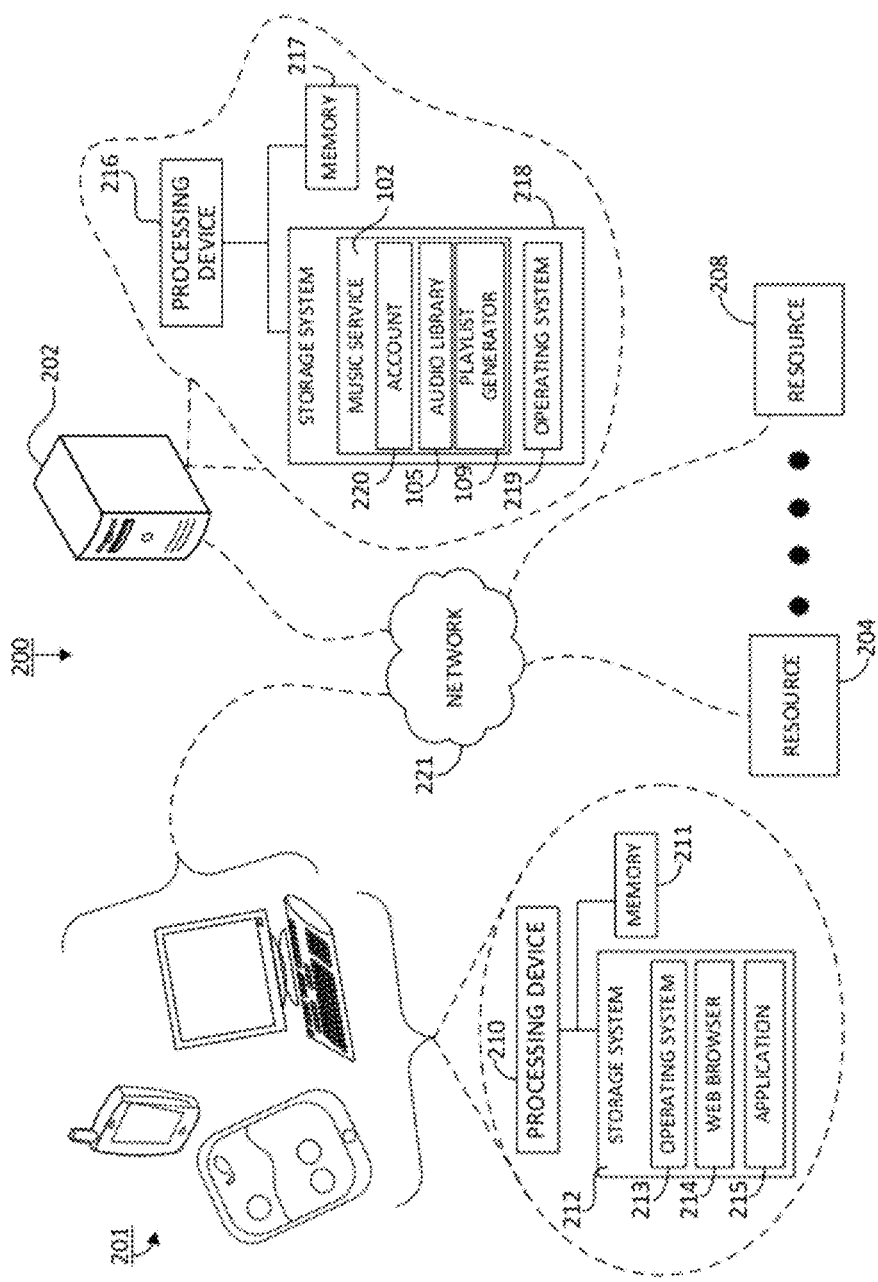
FIG. 2 is a block diagram of an example of a network system on which the process of FIG. 1 may be implemented.

FIG. 2 is a block diagram of an example of a system 200 on which the process of FIG. 1 may be implemented. System 200 includes one or more computing devices 201, one or more servers such as server 202, and network access to various sources of data, such as network resources 204 to 208.

Computing devices 201 may be, or include, a mobile computing device such as a cellular telephone (e.g., a feature phone or a smartphone), a desktop computer, a laptop computer, a handheld computer, a tablet computer, a network appliance, a camera, an enhanced general packet radio service (EGPRS) mobile phone, a media player, a navigation device, an electronic mail (e-mail) device, a game console, an electronic reader, or a combination of any two or more of these data processing devices or other data processing devices. In some implementations, the computing device can be included as part of a motor vehicle. A computing device may be the same as computing device 101 of FIG. 1.

Each computing device may include one or more processing devices 210, memory 211, and a storage system 212. Storage system 212 can store an operating system (OS) 213, and a Web browser 214, such as GOOGLE CHROME or MICROSOFT INTERNET EXPLORER, for accessing server 202 and network resources 204 to 208. Storage system 212 can also store computer programs, such as application 215. Application 215 may be for interacting with music service 102, which is hosted by server 202. For example, application 215 may include an electronic music player for playing audio tracks, and other programs and plug-ins for interacting with music service 102, either independently or in conjunction with Web browser 214.

Server 202 can represent various forms of servers, such as a Web server, an application server, a proxy server, a network server, or a server farm. Server 202 can also include, or be associated with, one or more data repositories (not shown separately) for storing information regarding audio tracks, audio track libraries, data tables, and other information that is usable by music service 102.

Server 202 can include one or more processing devices 216, memory 217, and a storage system 218. Storage system 218 can store an operating system (OS) 219 and a Web server program for hosting music service 102. In this example, music service 102 may be implemented via a Web site, and may include user account information 220, an audio library 105 for a user account, and a playlist generator 109. User account information 220 may include, e.g., settings associated with a user's account, such as information specifying the size, type and characteristics of playlists, user access information, and other user account-specific data. Audio library 105 may include audio tracks that the user has uploaded, or otherwise made available, to music service 102. The audio tracks and associated information (e.g., metadata tags) may be stored in a database, and indexed to the user's account. Playlist generator 109 may include executable code to generate playlists based, e.g., on a seed track designated in audio library 105. Examples of processes performed by playlist generator 109 to generate playlists are described below.

Network 221 can represent a communications network that can allow devices (e.g., computing devices 201) to effect wired or wireless communication through a communication interface (not shown), which may include digital signal processing circuitry, where necessary. Network 221 can include one or more networks available for use by the computing devices. The network(s) may provide for communications under various modes or protocols, such as Internet Protocol (IP), Global System for Mobile communication (GSM) voice calls, Short Message Service (SMS), Enhanced Messaging Service (EMS), Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. In an example, network communication may occur through a radio-frequency transceiver. In addition, short-range communication may occur, such as using a Bluetooth, WiFi, or other such transceiver.

Network resources 204 to 208 may include, for example, Web sites, file servers, or other sources that provide information, including information about music. An example of such a resource is ALLMUSICGUIDE.COM. The information itself may include, for example, information about artists, audio tracks, genres, publishers, albums, producers, concert tours, band members, relationships among bands, and so forth. This information may be obtained, e.g., by scraping in the case of public domain information or by licensing in the case of proprietary information. The information may form the basis of metadata tags that are used by playlist generator 109 in the manner described below to generate playlists using designated seed tracks. In this regard, the obtained information may include metadata, and may be stored in tables in a database for music service 102, which may be stored in audio library 105 in association with corresponding audio track(s).

In some implementations, the processes performed by playlist generator 109 include a training phase and a serving phase. These phases are summarized in the following paragraphs, and are explained in greater detail below.

In the training phase, metadata for audio tracks in a user's library is collected from various sources. Examples of those sources include, for example, YOUTUBE and ALLMUSICGUIDE.COM. Also in the training phase, auditory features are determined for tracks in the user's audio library 105. For example, stabilized auditory images (SAIs) may be generated for all or some of the audio tracks in audio library 105. SAIs are frequency representations of audio tracks that are similar to spectral maps. Although SAIs are used in this particular example, any other type of spectral or temporal features of an audio track may be used in lieu of, or in addition to, an SAI, to identify an auditory feature of a track. For example an audio track may be modeled using mel-frequency cepstral coefficients (MFCCs).

A machine leaning model may be used to associate audio tracks by genre, artist, auditory feature, etc. Any appropriate machine learning model may be used. In this example, a machine learning model is trained to generate matrices that produce "embeddings" corresponding to the auditory features (the SAIs are used in this example for illustration). Embeddings are constructs, such as N-dimensional points represented by N-dimensional vectors, that contain information from the SAIs about the audio tracks, but that represent the information using less data than the SAIs. Embeddings are also produced in a like manner for metadata for the tracks, and for artist information associated with the tracks. In this example, the embeddings that are generated have identical dimensions, and therefore can reside in the same embedding space.

In this example, the SAIs are converted to embeddings that are positioned in an N-dimensional embedding space ($N \geq 2$) close to embeddings for similar tracks and close to embeddings for metadata that is descriptive of those tracks in some way. The embeddings for metadata may be, e.g., for genre, such as rock music, classical music, etc. For example, in an embedding space, the machine-learning model may be trained to move embeddings for all rock music tracks near to the part of the N-dimensional embedding space that corresponds to rock music, to move embeddings for all country music tracks near to part of the N-dimensional embedding space that corresponds to country music, and so on. Movement occurs by modifying weights in a weight matrix (model) that is multiplied by the track features to obtain the track representation within the embedding, and similarly by modifying the weights in the weight vectors (also part of the model) that gives the genre/artist representations in the embedding space. This is a form of ranking, in that track embeddings that are closer to a particular metadata embedding in the embedding space may have more characteristics of that metadata, whereas track embeddings that are farther from that metadata embedding may have fewer characteristics of that metadata. For example, an embedding for a track from The Rolling Stones may be relatively close to a metadata embedding for rock music in the embedding space, whereas an embedding for a track by The Jackson Five may be relatively far from the metadata embedding for rock music in the embedding space, but not likely as far from the metadata embedding for rock music as an embedding for a classical track by Beethoven.

The foregoing embedding space may also account for artist similarity or, alternatively, a separate embedding space may be generated for artists. As above, embeddings for artists may be constructs, such as vectors, that contain descriptive features relating to an artist, and that are generated using metadata obtained for the artists from various sources. An embedding space may relate artists, e.g., by genre, era (e.g., sixties, seventies, eighties), or other commonalities. In an implementation, such an embedding space may move embeddings for rock artists around a metadata embedding for rock music, embeddings for country artists around metadata embeddings for country music, and so on. So, for example, embeddings representing The Beatles and The Rolling Stones may be closer to a metadata embedding for rock music or to a metadata embedding for sixties music in the embedding space than those for other artists, such as The Jackson Five, which may be closer to a metadata embedding for pop music or a metadata embedding for seventies music in the embedding space.

An embedding space may relate attributes of audio other than artists. For example, the embedding space may relate features for genre or style classes of the audio (e.g., "rock" or "hard rock"). These attributes may be used in place of, or an addition to, the artist features described herein in the generation of playlists.

Locations of points corresponding to entities in an embedding space, and associated embeddings for audio tracks, may be stored, e.g., in a repository associated with server 202 and a user's account. The embedding space can be queried using metadata tags, such as "rock". The embedding space can thus be used to generate a playlist in the serving phase.

In the serving phase, an example, process for generating a playlist includes identifying tracks having embeddings that are nearest neighbors in the embedding space to the embedding for a seed track. The importance of artists who perform those tracks is also accounted for in determining the tracks in the playlist. Various types of post-processing may also be performed to limit the number of artists present in the final playlist and to otherwise improve sequencing of the playlist. These features are described in more detail below.

Figure 3:
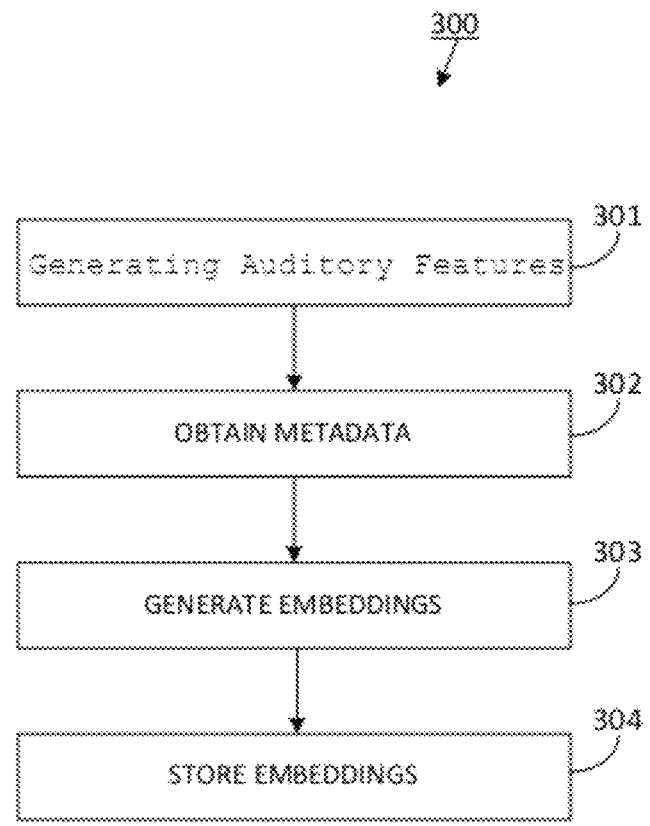
FIG. 3 is a flowchart showing an example of a training phase used in a process for generating playlist.

FIG. 3 is a flowchart showing example operations performed in the training phase. In process 300, auditory features (in this example, SATs) are generated (301) for audio tracks in audio library 105. As noted above, the audio tracks in the library may be uploaded from a computing device (e.g., one of computing devices 201) to music service 102, purchased from an online music store, or obtained via other channels. It is noted that SAIs may be generated using all of the tracks in library 105, or using a selected or defined subset of the tracks.

Figure 4:
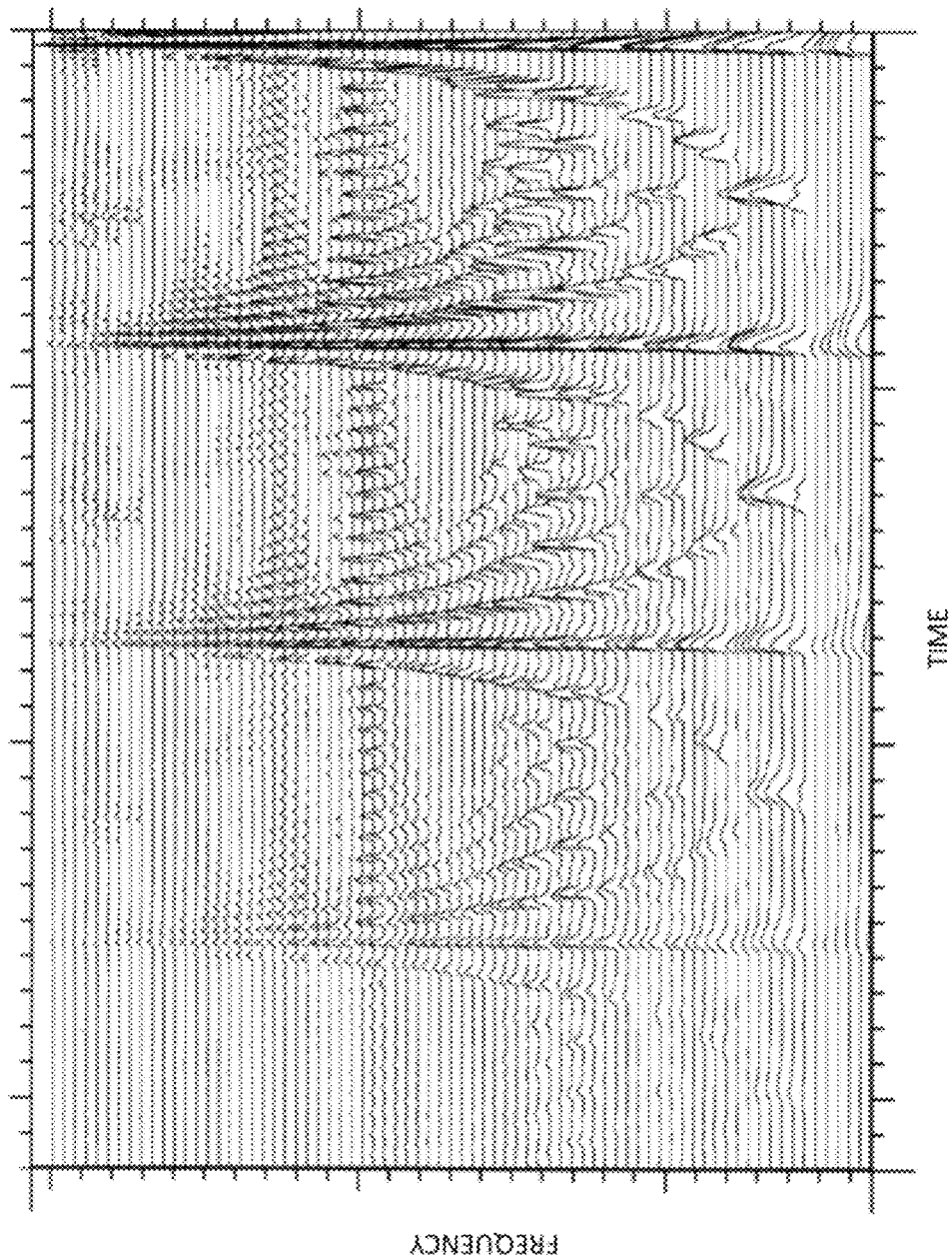
FIG. 4 is an example of a frequency representation of an audio track.

The SAIs may be generated using adaptive pole-zero filter cascade auditory filter banks, followed by sparse coding. In an example, the filter banks include, in sequence, low-frequency filters, medium-frequency filters, and high-frequency filters. As a sound passes through these filter banks, the sound is scored to produce values that correspond to that sound's frequency. Time slices of an audio track may be serially processed in this manner to produce a set of values for an entire track or a portion thereof. The set of values may be mapped, e.g., in three-dimensional (3D) space. The resulting mapping shows the auditory feature of the input sound, and is akin to a spectral graph. An example of an SAI for the vowel "a" is shown in FIG. 4. The more complex the sound is, the more data will be required to represent the SAI. In the case of a musical audio track, the resulting dataset can be quite large. Accordingly, one of the benefits of generating the embeddings described herein is to reduce the amount of data used to represent audio tracks. As noted, the entire SAI of an audio track need not be used in the processes described herein. Rather, an SAI of a portion of the audio track (e.g., thirty seconds) may be used.

SAIs are used in this example to enable playlist generator 109 to identify audio tracks that have similar auditory features; however, as noted above, other representations of audio tracks may be used. In an implementation, playlist generator 109 can infer based, e.g., solely on the similarity of two SAIs, that two corresponding tracks are of a similar type (e.g., both are for classical music) and, therefore, that both tracks may be incorporated into a single playlist. This is an advantage in that the auditory feature of an audio track can be used to generate a playlist based on that audio track. Accordingly, in some cases, playlist generator 109 may generate playlists of audio tracks without knowing anything about those tracks other than their auditory features. It is noted, however, that metadata (e.g., genre, artists, etc.) associated with acoustic tracks may also be used in determining which audio tracks to include in a playlist.

Referring back to FIG. 3, in a case where metadata is available for audio tracks in library 105, playlist generator 109 obtains (302) that metadata. The obtained metadata may be used to generate metadata tags, which playlist generator 109 associates with corresponding audio tracks. The metadata tags may be generated automatically by playlist generator (e.g., they need not be generated manually). In more detail, audio tracks, particularly those downloaded from an online music store, may include metadata identifying the name of the track and the name of the artist that performed the track. However, information such as the genre of the track, or information describing attributes of the artist who performed the track, may not be provided with the track. Accordingly, playlist generator 109 may use the information that is known about a track and associated artist to obtain additional information that can be associated with the track as metadata tags. Metadata tags can represent a wide range of concepts about audio, such as genre (rock, pop, jazz, etc.), instrumentation (guitar, violin, etc.), mood (sad, calm, dark, etc.), locale (Seattle, NYC, Indian), opinions (good, love, favorite) or any other general attribute of the music (fast, eastern, etc.). A set of metadata tags can provide a high-level semantic representation of a track that can be useful for tasks, such as music recommendation, playlist generation, or music similarity measure.

Metadata tag information may be obtained from network resources 204 to 208, such as Web sites or file servers on the Internet. Subscription sources may also be queried to license information that can be used to generate metadata tags. Examples of sources of metadata include, for example, information from YOUTUBE, such as video watch co-click data and music video playlists; information from ALLMUSICGUIDE.COM, such as identities of similar artists, genres and styles applied to artists, notable tracks and albums for an artist, and similar tracks based on co-occurrence in a compilation; information from FREEBASE, such as metadata structure (artist/album/track/release relationships), AMG, MUSICBRAINZ, and WIKIPEDIA foreign keys, genres, and "influence" links and other user-contributed links; WEB REF, ENTITYGRAPH, and RELATEDENTITIES information, such as interrelated projects that annotate entity references on the Internet using FREEBASE IDs signals derived from annotations, popularity data from WEBREF; Web crawl scrapes (e.g. from LAST.FM, MIXTUBE.ORG), including information such as as user collections (top N artists, tracks, etc.), playlists/recent listens, per-artist tags; and music service logs and other information, such as play counts and ratings. It is noted that licenses, if necessary, are obtained prior to using information.

Referring back to FIG. 3, playlist generator 109 generates (303) embeddings (e.g., vectors) for the auditory features (e.g., SAIs) and the metadata tags. The same embedding space that includes the embeddings for the SAIs and for the metadata tags may also incorporate embeddings for artist information associated with audio tracks in the library. The "artist" embeddings may include information such as the genre of the artist, the era of the artist, bands in which the artist has played, and so forth. In an example, playlist generator 109 uses techniques to train models (e.g., matrices) to map SAI, metadata and artist embeddings into the same N-dimensional embedding space (although, as noted, a separate embedding space may be used for artist information). The models may be trained using machine learning techniques designed to move embeddings in the embedding space near to each other if the tracks corresponding to those embeddings have some similarity. Examples of similarities that may result in track embeddings being moved together include, for example, similar music type, genre or artist. The similarities may be based on the tracks' SAIs and metadata tags associated with the tracks (e.g., a metadata tag identifying the genre of the track or artist that performed the track).

An example of a machine-learning technique that trains matrices and models an embedding space, is found in the paper, "Large Scale Image Annotation: Learning to Rank with Joint Word-Image Embeddings," by Jason Weston, Samy Bengio, and Nicolas Usunier (the "Weston paper"), incorporated herein by reference.

Machine-learning is used to perform two tasks in this example: (i) to identify similar artists, e.g., given an artist's name, return a ranked list of artists that are similar to that artist, and (ii) to identify similar tracks, e.g., given a song or audio clip, return a ranked list of songs that are similar to the song or audio clip.

In this example, machine learning trains tasks jointly using multi-tasking and the same embedding space. For each task, the parameters of a model (e.g., a matrix) that embeds entities of interest (e.g., SAI vectors, artist vectors) into the embedding space are learned in order to produce a desired result. In this implementation, an aim is to learn that particular entities (e.g. particular audio tracks and artists) should be close to each other in the embedding space. Resulting distances in the embedding space can then be used for playlist generation.

The machine learning technique used in this example accesses a database containing artist information (e.g., artists' names), audio tracks information (e.g., SAIs), and metadata tags associated with the artists and audio tracks. The resulting machine-learning training data is designated as triplets having the following form:

$$\mathcal{D} = \{(a_i, t_i, s_i)\}_{i=1,\ldots,m} \in \{1, \ldots, |\mathcal{A}|\}^{|a_i|} \times \{1, \ldots, |\mathcal{T}|\}^{|t_i|} \times \mathbb{R}^{|S|},$$

where each triplet represents an audio track indexed by i: $a_i$ are the artist features, $t_i$ are the metadata tag features, and $s_i$ are the audio (acoustic) features.

In this regard, each audio track may be a song and may have attributed to it a set of artists $a_i$, where each artist is indexed from 1 to $|\mathcal{A}|$ (indices into a dictionary of artist names). Hence, a given song can have multiple artists, although a song usually only has one artist, in which case $|a_i|=1$. Similarly, each song may also have a corresponding set of tags $t_i$, where each tag is indexed from 1 to 171 (indices into a dictionary of tags). The audio of a song—e.g., data for the song's SAI representation—is represented as an $|S|$ dimensional real-valued feature vector $S_i$.

Songs, artists and tags in an audio library can be processed jointly by learning a single model (e.g., a matrix or set of matrices) to capture the semantics of, and hence the relationships between, each of these musical concepts. The process used in this example assumes that these semantic relationships can be modeled in an embedding space of dimension d (d corresponding to the "N" in the N-dimensional embedding space described herein), where musical concepts (songs, artists and/or tags) are represented as coordinate vectors (points). The similarity between two concepts is measured using cosine similarity or a dot product between corresponding two vector representations of those concepts. The vectors are learned to induce similarities between features of corresponding audio tracks, e.g., their auditory features, artists, or genres.

For a given artist, indexed by $j \in 1, \ldots, |\mathcal{A}|$, its vector can be expressed as:

$$\Phi_{Artist}(i):\{1, \ldots, |\mathcal{A}|\} \to \mathbb{R}^d = A_i.$$

where $A=[A_1, \ldots, A_{|\mathcal{A}|}]$ is a $d \times |A|$ matrix of the parameters of all artists in the audio library. This matrix is learned during the training phase.

Similarly, for a given metadata tag, indexed by $j \in 1, \ldots |T|$, its vector can be expressed as:

$$\Phi_{Tag}(i):\{1, \ldots, |\mathcal{T}|\} \to \mathbb{R}^d = T_i.$$

where $T=[T_1, \ldots, T_{|T|}]$ is a $d \times |T|$ matrix of the parameters of all metadata tags in the audio library. This matrix is learned during the training phase.

For a given audio track (e.g., a song or other audio clip), there is the following function, which maps a song's auditory feature (e.g., its SAI) s' to a d-dimensional vector using a linear transform V:

$$\Phi_{Song}(s'): \mathbb{R}^{|S|} \to \mathbb{R}^d = Vs'.$$

The $d \times |S|$ matrix V is learned during the training phase.

Using the resulting vectors (embeddings) in the embedding space, for a given input, it is possible to rank possible outputs of interest such that the highest-ranked outputs are the best semantic match for the given input. For example, the following ranking functions, $f_i(x)$, identify, for a given seed track, a number of songs that are similar to the seed track, and a number of artists who are similar to the artist who performed the seed track:

$$f_j^{SimArtist}(i) = f_j^{SA}(i) = \Phi_{Artist}(j)^T \Phi_{Artist}(i) = A_j^T A_i$$

$$f_{s'}^{SimSong}(s'') = f_{s'}^{SS}(s'') = \Phi_{Song}(s')^T \Phi_{Song}(s'') = (Vs')^T Vs''$$

Generally speaking, training is performed to identify matrix elements that provide good ranking performance on a training set using a precision value k, where k represents the first k ($k \geq 1$) positions in a ranked list of desired results (e.g., a ranked list of audio tracks that have auditory features that are similar to an auditory feature of a seed track). The resulting matrix elements are then combined to form a matrix that is applied to input data (e.g., an SAI) to generate an embedding for that input data.

Parameters that provide relatively good ranking performance on the training data, $\mathcal{D}$, may be determined using multi-task training. To perform this training, an error function for a given task is defined as $\Sigma_i \text{err}(f(x_i), y_i)$, where x is a set of input examples, y is a set of targets for these examples, and err is a loss function that measures the quality of a proposed ranking. In the case of the similar song task, it is desired to minimize the function $\Sigma_i \text{err}(f^{SS}(S_i''), S_i')$ and, in the case of the similar artist task, it is desired to minimize the function $\Sigma_i \text{err}(f^{SA}(a_i''), a_i')$.

In performing multi-task training, the unweighted sum of the above two functions, is defined as follows:

$$err^{SS+SA}(\mathcal{D}) = \sum_{i=1}^{m} err(f^{SS}(s_i''), s_i') + \sum_{i=1}^{m} err(f^{SA}(a_i''), a_i').$$

This function may be optimized using stochastic gradient descent, which includes iteratively repeating the following: selecting one of the tasks at random, selecting training input-output pairs for the selected task, and producing a gradient step for this task and input-output pair. In this regard, candidates are compared in pairs to judge which candidate is preferred. The training input-output pairs are generally candidates that are believed to have a desired attribute and that are believed not to have a desired attribute. For example, a pair of audio tracks may be selected based on their metadata tags, or any other indication of similarity (e.g., both on the same compilation album). If training is being performed to generate embeddings for rock tracks, a track that is believed to be a rock track (based on its metadata) is selected, along with a track that is believed not to be a rock track. The resulting training generates elements for matrices used to convert information (e.g., auditory features or metadata) into embeddings that move together in the manner described above.

Examples of functions that may be used as the error function (err) in the training phase include the standard margin ranking loss (AUC) function and the weighted approximately ranked pairwise (WARP) loss function.

The standard margin ranking loss function assumes an input x and an output y (which can be replaced by artists, songs or tags). A loss, err, is defined as:

$$err_{AUC}(\mathcal{D}) = \sum_{i=1}^{m} \sum_{j \in y_i} \sum_{k \notin y_i} \max(0, 1 + f_k(x_i) - f_j(x_i))$$

This function considers all input-output pairs having positive and negative labels, and assigns each pair a cost if the negative label is larger or within a "margin" of one from the positive label.

To focus more on the top of a ranked list, where the top k positions are of interest, the following error ranking functions may be used:

$$err_{WARP}(\mathcal{D}) = \sum_{i=1}^{m} \sum_{j \in y_i} L(\text{rank}_j^1(f(x_i)))$$

where $\text{rank}_j^1(f(x_i))$ is the margin-based rank of a true label $j \in Y$ given by $f(x_i)$ $$\text{rank}_j^1(f(x_i)) = \sum_{k \notin y_i} I(1 + f_k(x_i) \geq f_j(x_i))$$

where I is the indicator function, and $L(\cdot)$ transforms this rank into a loss:

$$L(r) = \sum_{i=1}^{r} \alpha_i, \text{ with } \alpha_1 \geq \alpha_2 \geq \cdots \geq 0.$$

Different choices of $\alpha$ define different weights (importance) of the relative position of positive examples in a ranked list. In particular:

For $\alpha_i = 1$ for all I, the optimization is the same as that for $err_{AUC}$ above.
For $\alpha_1 = 1$ and $\alpha_{i>1} = 0$, the precision at 1 is optimized.
For $\alpha_{i \leq k} = 1$ and $\alpha_{i \leq k} = 0$, the precision at k is optimized.
For $\alpha_i = 1/i$, a smooth weighting over positions is given, where most weight is given to the top position in the ranked list, with rapidly decaying weight for lower positions.

This function $L(r)$ may be optimized by stochastic gradient descent. That is, samples are drawn at random, and a gradient step is made for each sample. Due to the cost of computing the exact rank, the exact rank may be approximated by sampling. That is, for a given positive label, one draws negative labels until a violating pair is found, and then approximates the rank with the following function:

$$\text{rank}_j^1(f(x_i)) \approx \left\lfloor \frac{Y-1}{N} \right\rfloor$$

where $f(x_i)$ is the floor function, Y is the number of output labels (which is task dependent) and N is the number of trials in the sampling step. If more negative labels need to be sampled before a violator is found, then the rank of the true label is likely to be small, e.g., it is likely to be at the top of the list, as few negatives are above it.

An example of pseudo code for performing training is shown below.

Input: labeled data for several tasks.

Initialize model parameters $\left(\text{we use mean 0, standard deviation } \frac{1}{\sqrt{d}}\right)$.

repeat
    Pick a random task, and let $f(x') = \Phi_{Output}(y')^T \Phi_{Input}(x')$ be the prediction function for that task, and let x and y be its input and output examples, where there are Y possible output labels.
    Pick a random labeled example $(x_i, y_i)$ (for the task chosen).
    Pick a random positive label $j \in y_i$ for $x_i$.
    Compute $f_j(x_i) = \Phi_{Output}(j)^T \Phi_{Input}(x_i)$
    Set N = 0.
    repeat
        Pick a random negative label $k \in \{1, \ldots, Y\} \notin y_i$.
        Compute $f_k(x_i) = \Phi_{Output}(k)^T \Phi_{Input}(x_i)$
        N = N + 1.
    until $f_k(x_i) > f_j(x_i) - 1$ or $N \geq Y - 1$
    if $f_k(x_i) > f_j(x_i) - 1$ then
        Make a gradient step to minimize:

$$L\left(\left\lfloor \frac{Y-1}{N} \right\rfloor\right) |1 - f_j(x_i) + f_k(x_i)|_+$$

Project weights to enforce constraints (1)-(3).
    end if
until validation error does not improve.

In the above pseudo code, constraints (1) to (3) are as follows:

$$\|A_i\|_2 \le C, i=1,\ldots,|\mathcal{A}|, \quad (1)$$

$$\|T_i\|_2 \le C, i=1,\ldots,|\mathcal{T}|, \quad (2)$$

$$\|V_j\|_2 \le C, i=1,\ldots,|S|, \quad (3),$$

where C is a hyperparameter that acts as a regularizer.

Referring back to FIG. 3, the embeddings that are generated are stored (304), e.g., in a database for music service 102. As new audio tracks are added to the audio library, additional embeddings may be generated, and it may be necessary to update the training models. The training models need not be updated each time a new audio track is added. Instead, the training models may be updated periodically, e.g., once a week or in response to the addition of a number of tracks to the library. Embeddings for the new audio tracks may be generated as those tracks are added, or periodically, e.g., on a daily basis.

Figure 5:
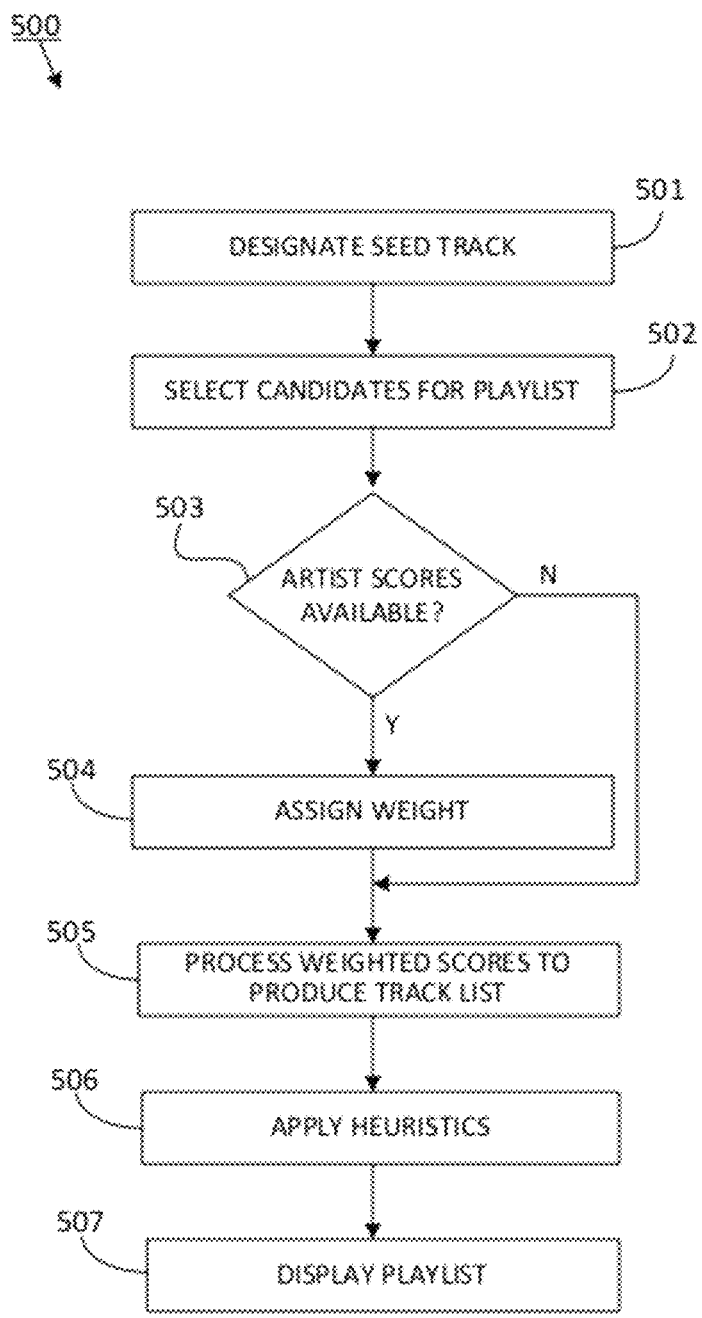
FIG. 5 is an example of a serving phase used in a process for generating playlist.
Figure 6:
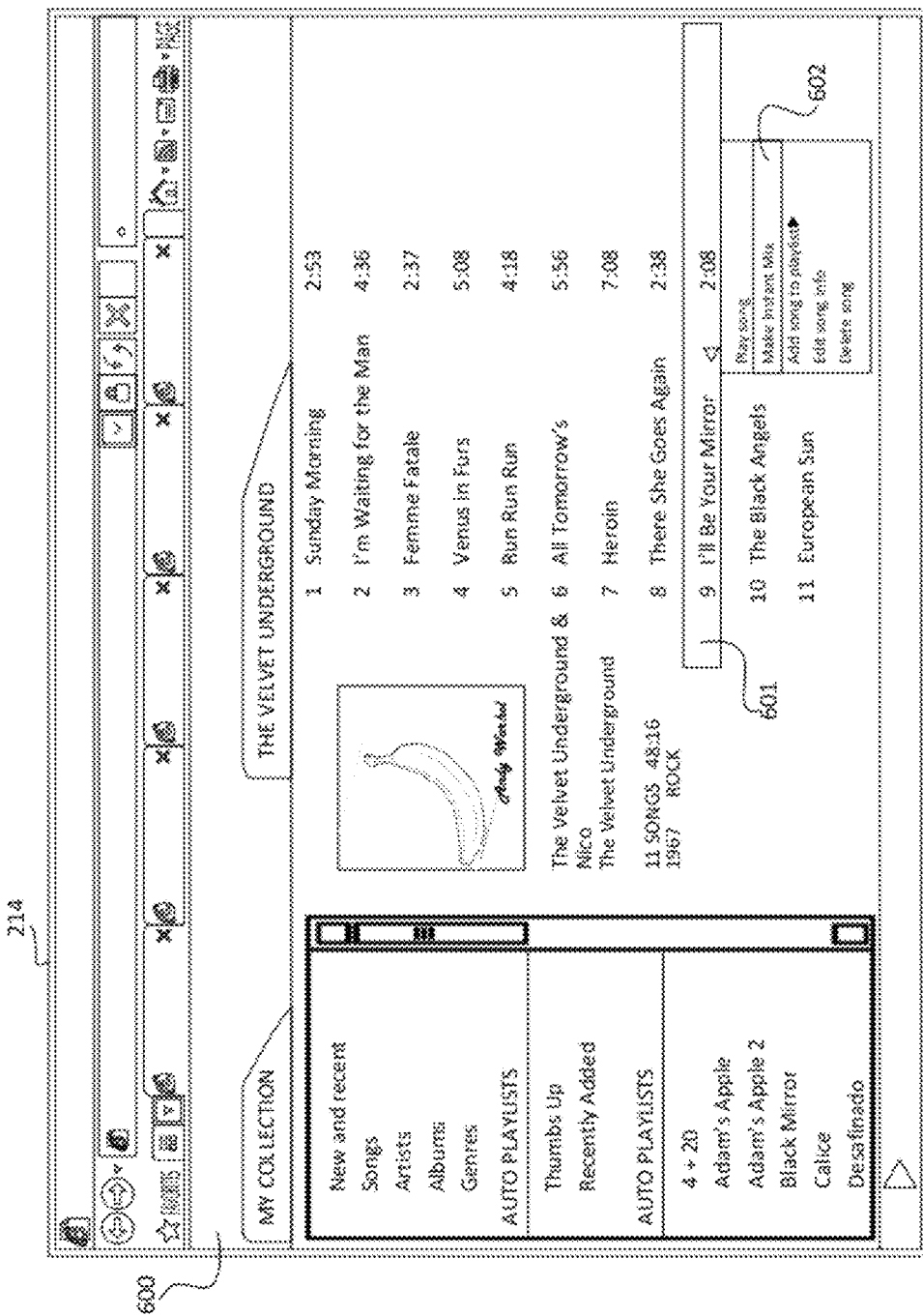
FIG. 6 is a graphical user interface (GUI) showing an option to generate a playlist based on a seed track.

FIG. 5 shows an example of the serving phase of playlist generation. According to process 500, playlist generator 109 designates (501) a seed track. This may be done in response to user selection of the seed track. For example, referring to FIG. 6, a user may select a song 601 from a list of songs displayed in a GUI 600 in Web browser 214. By right-clicking on the selected song, the user is presented with an option 602 to "make an instant mix", e.g., a playlist. Using that option 602, the user may elect to generate a playlist based on track 601.

In response to the user selection, playlist generator 109 designates the user-selected track as the seed track. Playlist generator 109 selects (502) candidates for the playlist using the designated seed track. In this implementation, playlist generator 109 accesses an embedding (e.g., a vector) for the seed track, and compares that embedding to embeddings for other audio tracks in the user's audio library. For example, a cosine similarity measurement may be taken between the embedding for the seed track and embeddings for all or some other acoustic tracks in the library in order to identify distances between embeddings. Those embeddings that are within a specified distance of the embedding for the seed track are designated as candidates for the playlist. The distances represent scores for the candidate tracks.

In some implementations, playlist generator 109 may also identify the artist who performed the seed track. This identification may be made by accessing metadata tag(s) for the seed track. The embedding for the artist may then be used to identify artists who are similar, in some respect, to the artist who performed the seed track. Again, a cosine similarity measurement may be taken between the embedding for the artist who performed the seed track and embeddings for other artists who have tracks in the audio library in order to identify distances between vectors. Those embeddings that are within a specified distance of the embedding for the artist who performed the seed track are identified. The distances represent scores for artists, and may be used to generate the playlist.

In this regard, it is noted that the artist information is not needed to generate the playlist. Rather, a playlist may be generated using only candidate tracks, or some subset thereof, that have scores that do not exceed a threshold. In a case where artist scores are available (503), playlist generator may assign (504) weights to the artist scores and candidate track scores. The weights may designate the relative importance of the artist and track auditory feature in deciding which audio tracks are to be assigned to a playlist. For example, a higher weight assigned to the candidate track score may mean that more emphasis is being placed on auditory feature in generating a playlist, and a higher weight associated to the artist score may mean that more emphasis is being placed on the identity of the artist who performed the seed track in generating a playlist.

Playlist generator 109 processes (505) the weighted candidate track scores (or unweighted scores if no weights are applied) and artist scores to arrive at a list of audio tracks to include in the playlist. For example, if artists' scores are weighted heavily, playlist generator 109 may select candidate tracks based on which artist performed those tracks. In an example, track A has a distance of five from the seed track, track B has a distance of seven from the seed track, and track C has a distance of nine from the seed track. If artist information is not taken into account, and there is a limit to a number of tracks in the playlist, in an example, only tracks A and B will be considered candidates for the playlist. However, in that same example, assume that artist information is taken into account and is weighted relatively heavily, and also assume that tracks A and C are by artists who have scores that make them relatively close to the artist who performed the seed track. By contrast, track B is by an artist who has a score that makes that artist relatively farther from the artist who performed the seed track. In this case, playlist generator may select tracks A and C as candidates for the playlist.

After playlist generator 109 produces a set of candidate tracks for the playlist, one or more heuristics may be applied (506) to limit which tracks are actually included in the playlist. For example, the heuristics may include, but are not limited to, limitations on the number of tracks included in a playlist by the same artist, limitations on the lengths of tracks included in the playlist, limitations on the identities of artist included in the playlist (e.g., certain artists are to be excluded from the playlist), and so forth. Playlist generator 109 may access metadata tags associated with the candidate tracks to determine whether particular tracks comply with, or violate, certain heuristics. Following application of the heuristics, the list of candidate tracks is reduced (if applicable) to the list of tracks that are to be included in playlist.

Figure 7:
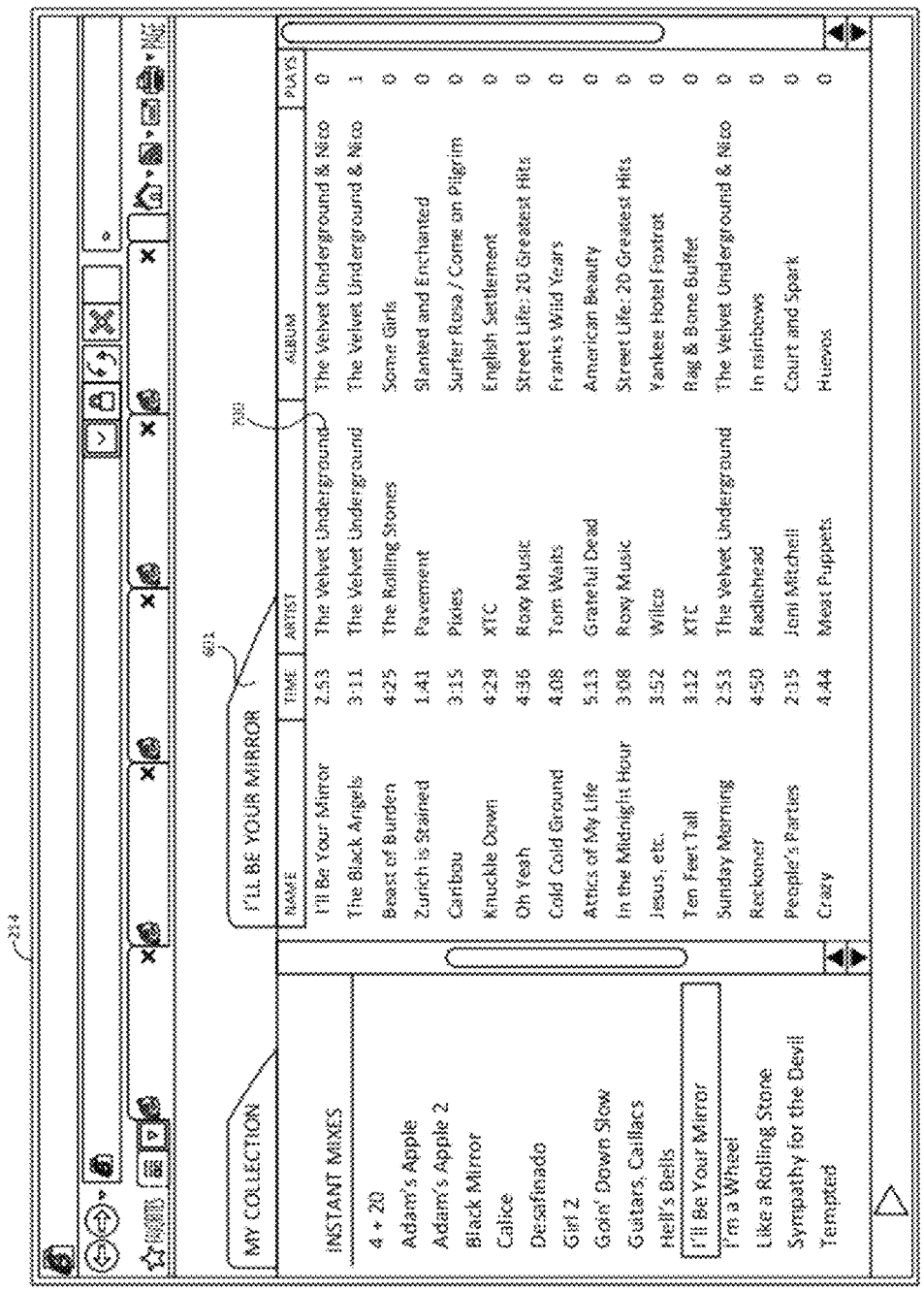
FIG. 7 is a GUI showing an example of a playlist generated using the seed track of FIG. 6.

Playlist generator 109 retrieves information for the list of tracks to be included in the playlist, and displays (509) the playlist, including those tracks in a GUI. An example of such a GUI, which is displayed in a Web browser 214, is shown in FIG. 7. There, the seed track 601 is identified, and the playlist 700 that is generated from that seed track is shown. The tracks in the playlist may be played in order on a digital media device (e.g., a desktop computer, a smartphone, or the like), and in the order shown, in a user-defined order, or in a random order. In some implementations, the tracks may be ordered based on user preference or other factors. For example, a decreasing-similarity preference function may be used to decide the final order of the tracks, with tracks most similar to the seed track beginning the playlist, and subsequent tracks that are less similar to the seed track being further down the playlist. In this regard, there are two issues. First, when ordering the tracks, it is preferable to spread-out the tracks by the same artist, and also, each time the user provides the same seed track, a different playlist should be generated. So some amount of randomization may be used. In this example, a decreasing-similarity preference function is used that does not have tracks by the same artists adjacent, and that includes some randomization.

Figure 8:
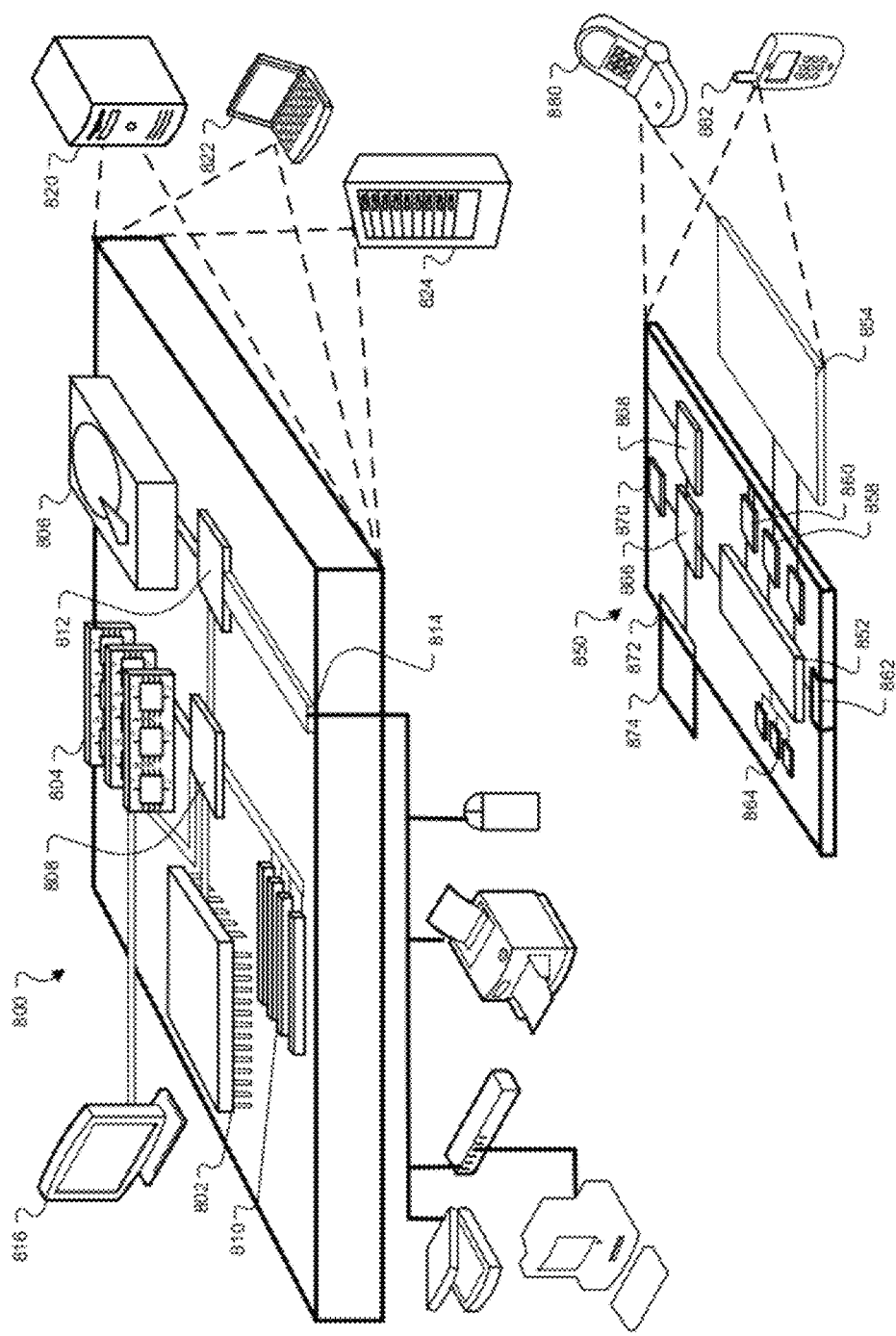
FIG. 8 shows examples of computing devices that may be used to perform the processes, or elements thereof, depicted in FIGS. 1 to 7.

FIG. 8 shows an example of a generic computer device 800 and a generic mobile computer device 850, which may be used to implement the process and any variations thereto described herein, including the mobile device-side actions, the computing device-side actions, and and server-side actions. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 804, the storage device 806, or memory on processor 802. For example, the information carrier may be a non-transitory, machine-readable storage medium.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. A display screen, such as an LCD (Liquid Crystal Display) or a CRT (Cathode Ray Tube) displays, to a user, images that are generated by a client including, but not limited to, the graphical user interfaces herein. As is well known, display on a display screen (e.g., a monitor) physically transforms the display screen. For example, if the display screen is LCD-based, the orientation of liquid crystals can be changed by the application of biasing voltages in a physical transformation that is visually apparent to the user. As another example, if the display screen is a CRT, the state of a fluorescent screen can be changed by the impact of electrons in a physical transformation that is also visually apparent.

The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 80 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The playlist generation process described herein is not limited to use with the machine learning techniques, mappings (e.g., SAIs), or other features described in this patent application. For example, suitable alternatives may be substituted for such features. Furthermore, the playlist generation process is not limited to use with the music service described herein, but rather may be used with any type of online or offline computer programs that provide access to audio tracks. The audio tracks furthermore need not be for music, but rather can include any type of audio. For example, the playlist generation process may be used to generate playlists that include spoken text in a particular language (e.g., Japanese) or a particular group of languages (e.g., Romance languages: French, Italian, Spanish, etc.).

In some implementations, more than one seed track may be used to generate a single playlist. For example, the foregoing processes may be used to identify playlist tracks corresponding to multiple seed tracks, and those playlist tracks may be combined into a single playlist. Tracks in that single playlist may be played and ordered in any appropriate manner described herein.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions Other implementations not specifically described herein are also within the scope of the following claims.

What is claimed is:

1. A method of generating playlists, comprising:
   receiving a user selection of a seed track from audio tracks in an audio library, each of the audio tracks, including the seed track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;
   in response to receiving the user selection of the seed track, cause a user interface element to be presented that generates a playlist based on the seed track;
   in response to receiving a selection of the user interface element, identifying audio tracks in the audio library having corresponding constructs that are within a given range of a corresponding construct of the seed track, wherein the corresponding constructs within the range are similar to the corresponding construct of the seed track;
   determining distances between the construct for the seed track and the constructs for the identified audio tracks that are within the given range;
   assigning weights to artist scores and candidate track scores of the identified audio tracks based on the determined distances to generate weighted artist scores and weighted candidate track scores;
   generating the playlist using at least a portion of the identified audio tracks based on the weighted artist scores and the weighted candidate track scores;
   in response to generating the playlist, ordering tracks in the playlist in accordance with a randomized decreasing-similarity preference function so that there are no adjacent tracks by the same artist in the ordered tracks in the playlist; and
   causing the ordered playlist to be presented.

2. The method of claim 1, wherein identifying audio tracks in the audio library having corresponding constructs that are within a range of a corresponding construct of the seed track comprises comparing the distances to a designated distance corresponding to the range.

3. The method of claim 2, wherein the distances are determined using cosine similarity measurements.

4. The method of claim 2, further comprising applying weights to the distances, the weights being indicative of relative importance of frequency representations of audio tracks in generating the playlist.

5. The method of claim 1, wherein each audio track is represented by a second construct derived from attributes of the corresponding audio track, and the seed track is represented by a corresponding second construct derived from an attribute associated with the seed track; and
   wherein the method further comprises:
      determining distances between the second constructs for the audio tracks and the corresponding second construct for the seed track;
      wherein identifying audio tracks in the audio library having corresponding constructs that are within a range of a corresponding construct of the seed track comprises comparing the distances to a designated distance corresponding to the range.

6. The method of claim 1, wherein obtaining the metadata tags comprises:
   retrieving information about the audio track from one or more sources; and generating the metadata tags using the information.

7. The method of claim 1, wherein the construct is generated using a machine-learning technique configured to move, towards each other, audio tracks in a same or similar genre in an N-dimensional space (N2:2), the N-dimensional space being derived from features of the audio tracks.

8. The method of claim 1, further comprising:
   using one or more heuristics to select audio tracks within the range;
   wherein the playlist is generated using the audio tracks that were selected using the one or more heuristics.

9. The method of claim 8, wherein the one or more heuristics comprise limitations on numbers of audio tracks having a specific attribute.

10. The method of claim 1, wherein each of the audio tracks is represented by a second construct derived from a corresponding artist associated with the audio track, and the seed track is represented by a corresponding second construct derived from an artist associated with the seed track; and
    wherein the method further comprises:
       determining distances between the second constructs for the audio tracks and the corresponding second construct for the seed track;
       wherein identifying audio tracks in the audio library having corresponding constructs that are within a range of a corresponding construct of the seed track comprises comparing the distances to a designated distance corresponding to the range.

11. The method of claim 1, further comprising designating a second audio track in an audio library;
    identifying additional audio tracks in the audio library having second constructs that are within a range of a corresponding second construct of the second audio track, the second constructs for the additional audio tracks being derived from second frequency representations of the additional audio tracks, and the corresponding second construct for the second audio track being derived from a second frequency representation of the seed track; and
    wherein the playlist is generated using at least some of the additional audio tracks that were identified.

12. An apparatus comprising a non-transitory machine-readable storage medium having instructions encoded thereon that, in response to execution by a computing device, cause the computing device to perform operations comprising:
  receiving a user selection of a seed track from audio tracks in an audio library, each of the audio tracks, including the seed track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;
  in response to receiving the user selection of the seed track, cause a user interface element to be presented that generates a playlist based on the seed track;
  in response to receiving a selection of the user interface element, identifying audio tracks in the audio library having corresponding constructs that are within a given range of a corresponding construct of the seed track, wherein the corresponding constructs within the range are similar to the corresponding construct of the seed track;
  determining distances between the construct for the seed track and the constructs for the identified audio tracks that are within the given range;
  assigning weights to artist scores and candidate track scores of the identified audio tracks based on determined distances to generate weighted artist scores and weighted candidate track scores;
  generating the playlist using at least a portion of the identified audio tracks based on the weighted artist scores and the weighted candidate track scores;
  in response to generating the playlist, ordering tracks in the playlist in accordance with a randomized decreasing-similarity preference function so that there are no adjacent tracks by the same artist in the ordered tracks in the playlist; and
  causing the ordered playlist to be presented.

13. A system for generating playlists, comprising:
  one or more non-transitory machine-readable storage media storing instructions; and
  one or more processing devices for using the instructions to perform operations comprising:
    receiving a user selection of a seed track from audio tracks in an audio library, each of the audio tracks, including the seed track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;
    in response to receiving the user selection of the seed track, cause a user interface element to be presented that generates a playlist based on the seed track;
    in response to receiving a selection of the user interface element, identifying audio tracks in the audio library having corresponding constructs that are within a given range of a corresponding construct of the seed track, wherein the corresponding constructs within the range are similar to the corresponding construct of the seed track;
    determining distances between the construct for the seed track and the constructs for the identified audio tracks that are within the given range;
    assigning weights to artist scores and candidate track scores of the identified audio tracks based on the determined distances to generate weighted artist scores and weighted candidate track scores;
    generating the playlist using at least a portion of the identified audio tracks based on the weighted artist scores and the weighted candidate track scores;
    in response to generating the playlist, ordering tracks in the playlist in accordance with a randomized decreasing-similarity preference function so that there are no adjacent tracks by the same artist in the ordered tracks in the playlist; and
    causing the ordered playlist to be presented.

14. A system for generating playlists, comprising:
  an interface for communication over a network; and
  one or more hardware processors that perform operations comprising:
    receiving a user selection of a seed track from audio tracks in an audio library, each of the audio tracks, including the seed track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;
    in response to receiving the user selection of the seed track, cause a user interface element to be presented that generates a playlist based on the seed track;
    in response to receiving a selection of the user interface element, identifying audio tracks in the audio library having corresponding constructs that are within a given range of a corresponding construct of the seed track, wherein the corresponding constructs within the range are similar to the corresponding construct of the seed track;
    determining distances between the construct for the seed track and the constructs for the identified audio tracks that are within the given range;
    assigning weights to artist scores and candidate track scores of the identified audio tracks based on the determined distances to generate weighted artist scores and weighted candidate track scores;
    generating the playlist using at least a portion of the identified audio tracks based on the weighted artist scores and the weighted candidate track scores;
    in response to generating the playlist, ordering tracks in the playlist in accordance with a randomized decreasing-similarity preference function so that there are no adjacent tracks by the same artist in the ordered tracks in the playlist; and
    causing the ordered playlist to be presented.

15. A method of identifying similar audio tracks, comprising:

receiving a user selection of a first track among multiple audio tracks, each of the audio tracks, including the first track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;

in response to receiving the user selection of the first track, cause a user interface element to be presented that generates a playlist based on the first track;

in response to receiving a selection of the user interface element, identifying audio tracks among the multiple audio tracks having corresponding constructs that are within a given range of a corresponding construct of the first track, wherein corresponding the constructs within the range are similar to the corresponding construct of the first track;

determining distances between the construct for the first track and the constructs for the identified audio tracks that are within the given range;

assigning weights to artist scores and candidate track scores of the identified audio tracks based on the determined distances to generate weighted artist scores and weighted candidate track scores;

outputting an indication that the first track and the audio tracks are similar based on the weighted artist scores and the weighted candidate track scores;

ordering tracks in the playlist in accordance with a randomized decreasing-similarity preference function so that there are no adjacent tracks by the same artist in the ordered tracks in the playlist; and causing the ordered playlist to be presented.

16. The method of claim 15, wherein identifying audio tracks among the multiple audio tracks having corresponding constructs that are within a range of a corresponding construct of the first track comprises comparing the distances to a designated distance corresponding to the range.

17. An apparatus comprising a non-transitory machine-readable storage medium having instructions encoded thereon that, in response to execution by a computing device, cause the computing device to perform operations comprising:

receiving a user selection of a first track among multiple audio tracks, each of the audio tracks, including the first track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;

in response to receiving the user selection of the first track, cause a user interface element to be presented that generates a playlist based on the first track;

in response to receiving a selection of the user interface element, identifying audio tracks among the multiple audio tracks having corresponding constructs that are within a given range of a corresponding construct of the first track, wherein corresponding the constructs within the range are similar to the corresponding construct of the first track;

determining distances between the construct for the first track and the constructs for the identified audio tracks that are within the given range;

assigning weights to artist scores and candidate track scores of the identified audio tracks based on the determined distances to generate weighted artist scores and weighted candidate track scores;

outputting an indication that the first track and the audio tracks are similar based on the weighted artist scores and the weighted candidate track scores;

ordering tracks in the playlist in accordance with a randomized decreasing-similarity preference function so that there are no adjacent tracks by the same artist in the ordered tracks in the playlist; and causing the ordered playlist to be presented.

18. A system for generating a playlist, comprising:

one or more non-transitory machine-readable storage media storing instructions; and one or more processing devices for using the instructions to perform operations comprising:

receiving a user selection of a first track among multiple audio tracks, each of the audio tracks, including the first track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;

in response to receiving the user selection of the first track, cause a user interface element to be presented that generates a playlist based on the first track;

in response to receiving a selection of the user interface element, identifying audio tracks among the multiple audio tracks having corresponding constructs that are within a given range of a corresponding construct of the first track, wherein corresponding the constructs within the range are similar to the corresponding construct of the first track;

determining distances between the construct for the first track and the constructs for the identified audio tracks that are within the given range;

assigning weights to artist scores and candidate track scores of the identified audio tracks based on the determined distances to generate weighted artist scores and weighted candidate track scores;

outputting an indication that the first track and the audio tracks are similar based on the weighted artist scores and the weighted candidate track scores;

ordering tracks in the playlist in accordance with a randomized decreasing-similarity preference function so that there are no adjacent tracks by the same artist in the ordered tracks in the playlist; and causing the ordered playlist to be presented.

19. A system for generating a playlist, comprising:

an interface for communication over a network; and one or more hardware processors that perform operations comprising:

receiving a user selection of a first track among multiple audio tracks, each of the audio tracks, including the first track, being represented by a construct, each construct for each of the audio tracks being determined by obtaining metadata tags for a corresponding audio track, the metadata tags relating to one or more attributes of the corresponding audio track, generating a frequency representation of the corresponding audio track, and generating the construct using both the metadata tags and the frequency representation, each construct represented by a vector wherein the frequency representation includes at least one of a stabilized auditory image and a mel-frequency cepstral coefficient;

in response to receiving the user selection of the first track, cause a user interface element to be presented that generates a playlist based on the first track;

in response to receiving a selection of the user interface element, identifying audio tracks among the multiple audio tracks having corresponding constructs that are within a given range of a corresponding construct of the first track, wherein corresponding the constructs within the range are similar to the corresponding construct of the first track;

determining distances between the construct for the first track and the constructs for the identified audio tracks that are within the given range;

assigning weights to artist scores and candidate track scores of the identified audio tracks based on the determined distances to generate weighted artist scores and weighted candidate track scores;

outputting an indication that the first track and the audio tracks are similar based on the weighted artist scores and the weighted candidate track scores;

ordering tracks in the playlist in accordance with a randomized decreasing-similarity preference function so that there are no adjacent tracks by the same artist in the ordered tracks in the playlist; and causing the ordered playlist to be presented.

* * * * *